US011411915B2

(12) United States Patent
Hill et al.

(10) Patent No.: US 11,411,915 B2
(45) Date of Patent: Aug. 9, 2022

(54) LEVERAGING MACSEC KEY AGREEMENT (MKA) STATE EVENTS TO TRIGGER FAST IGP/EGP CONVERGENCE ON MACSEC ENCRYPTED LINKS

(71) Applicant: Cisco Technology, Inc., San Jose, CA (US)

(72) Inventors: Craig Thomas Hill, Sterling, VA (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 867 days.

(21) Appl. No.: 16/243,733

(22) Filed: Jan. 9, 2019

(65) Prior Publication Data

US 2020/0220843 A1 Jul. 9, 2020

(51) Int. Cl.
*H04L 45/021* (2022.01)
*H04L 9/40* (2022.01)
(Continued)

(52) U.S. Cl.
CPC ........ *H04L 63/0209* (2013.01); *H04L 9/0838* (2013.01); *H04L 45/021* (2013.01); *H04L 63/0428* (2013.01); *H04L 69/18* (2013.01)

(58) Field of Classification Search
CPC ............. H04L 63/0209; H04L 63/0428; H04L 63/061; H04L 63/162; H04L 9/0838; H04L 45/021; H04L 45/026; H04L 69/18
See application file for complete search history.

(56) References Cited

U.S. PATENT DOCUMENTS 6,976,071 B1 * 12/2005 Donzis ................ H04L 43/0811
709/224
7,881,318 B2 * 2/2011 Herzog .................. H04L 67/14
370/401

(Continued)

FOREIGN PATENT DOCUMENTS

WO 2018095256 A1 5/2018

OTHER PUBLICATIONS

Brian Weis, "Security considerations and proposal for MACsec key establishment", May 15, 2006, 18 pages.

(Continued)

*Primary Examiner* — Lynn D Feild
*Assistant Examiner* — Abdullah Almamun
(74) *Attorney, Agent, or Firm* — Edell, Shapiro & Finnan, LLC

(57) ABSTRACT

A network device configured to communicate with a network executes a security protocol. The security protocol establishes a secure session with a security peer network device, exchanges security protected traffic with the security peer network device over a secure link, detects whether there is a security failure in the secure session, and upon detecting a security failure, signals there is a security failure. The network device also executes a routing protocol. The routing protocol maintains a routing table that includes a route to the security peer over the secure link, routes the security protected traffic along the route, and, upon receiving from the security protocol the signal that there is a security failure, removes the route from the routing table to stop the routing.

20 Claims, 6 Drawing Sheets

(51) Int. Cl.
*H04L 9/08* (2006.01)
*H04L 69/18* (2022.01)

(56) References Cited

U.S. PATENT DOCUMENTS

| | | | |
|---|---|---|---|
| 7,990,886 B2* | 8/2011 | Lin | H04L 12/2898 370/252 |
| 8,386,772 B2 | 2/2013 | Guan | |
| 8,458,248 B2* | 6/2013 | Son | H04L 63/0272 709/203 |
| 8,732,324 B2 | 5/2014 | Weis | |
| 8,880,869 B1* | 11/2014 | Shah | H04L 63/205 713/151 |
| 9,660,860 B1* | 5/2017 | Rekhter | H04L 41/0631 |
| 9,843,520 B1* | 12/2017 | Haltore | H04L 47/125 |
| 10,469,461 B1* | 11/2019 | Singh | G06F 21/57 |
| 10,972,442 B1* | 4/2021 | P N | H04L 9/088 |
| 11,146,952 B2* | 10/2021 | Sheng | H04L 9/0838 |
| 2002/0131362 A1* | 9/2002 | Callon | H04L 41/069 370/227 |
| 2003/0229779 A1* | 12/2003 | Morais | H04L 63/0428 713/153 |
| 2006/0023728 A1* | 2/2006 | Desiderio | H04M 7/0093 370/401 |
| 2008/0126559 A1* | 5/2008 | Elzur | H04L 63/0464 709/232 |
| 2009/0037601 A1* | 2/2009 | Jain | H04L 12/66 709/242 |
| 2009/0285213 A1* | 11/2009 | Chen | H04W 40/28 370/392 |
| 2011/0296044 A1* | 12/2011 | Weis | H04L 43/0811 709/230 |
| 2015/0207793 A1* | 7/2015 | Mohamed | H04L 41/12 726/6 |
| 2015/0365409 A1* | 12/2015 | Mohamed | H04L 63/061 713/170 |
| 2019/0116183 A1* | 4/2019 | Hussain | H04L 63/08 |
| 2019/0386824 A1* | 12/2019 | Havaralu Rama Chandra Adiga | H04L 9/0833 |
| 2020/0389469 A1* | 12/2020 | Litichever | H04L 12/4633 |

OTHER PUBLICATIONS

Cisco, "MACsec Encryption", downloaded Jan. 3, 2019 from https://www.cisco.com/c/en/us/td/docs/switches/lan/catalyst9300/software/release/16-8/configuration_guide/sec/b_168_sec_9300_cg/macsec_encryption.pdf, 28 pages.

* cited by examiner

LEVERAGING MACSEC KEY AGREEMENT (MKA) STATE EVENTS TO TRIGGER FAST IGP/EGP CONVERGENCE ON MACSEC ENCRYPTED LINKS

TECHNICAL FIELD

The present disclosure relates to the behavior of security protocols and routing protocols in the event of link failures.

BACKGROUND

Network traffic may be secured using media access control (MAC) security (MACsec), as defined under the Institute of Electrical and Electronics Engineers (IEEE) 802.1AE standard. The media access control (MAC) security (MACsec) Key Agreement (MKA) protocol may be employed to establish a secure session between MKA peers (e.g., routers) in a network, as defined under the IEEE 802.1X standard. During the secure session, the MKA peers exchange MACsec encrypted traffic over a secure link, and MKA peer maintenance detects failures of the secure session. In parallel, a routing protocol, such as the Interior Gateway Protocol (IGP), maintains routing paths for routing/forwarding of the MACsec encrypted traffic between the MKA peers. Similar to MKA, the IGP employs IGP peer maintenance to detect routing neighbor failures. Conventionally, MKA and IGP peer maintenance operate independently. Thus, under certain network conditions, MKA peer maintenance may detect a failure of, and tear-down, the secure session, while IGP peer maintenance fails to detect any corresponding failure, and continues to forward traffic as if the secure session were intact. Such continued forwarding of traffic after the secure session has been torn-down is undesirable.

DESCRIPTION OF EXAMPLE EMBODIMENTS

Overview

A network device is configured to communicate with a network, execute a security protocol, and execute a routing protocol. The security protocol establishes a secure session with a security peer network device, exchanges security protected traffic with the security peer network device over a secure link, detects whether there is a security failure in the secure session, and upon detecting a security failure, signals to the routing protocol that there is a security failure. The routing protocol maintains a routing table that indicates a route to the security peer network device over the secure link, routes the encrypted traffic along the route, and, upon receiving from the security protocol the signal that there is a security failure, removes the route from the routing table to stop the routing.

Example Embodiments

Figure 1:
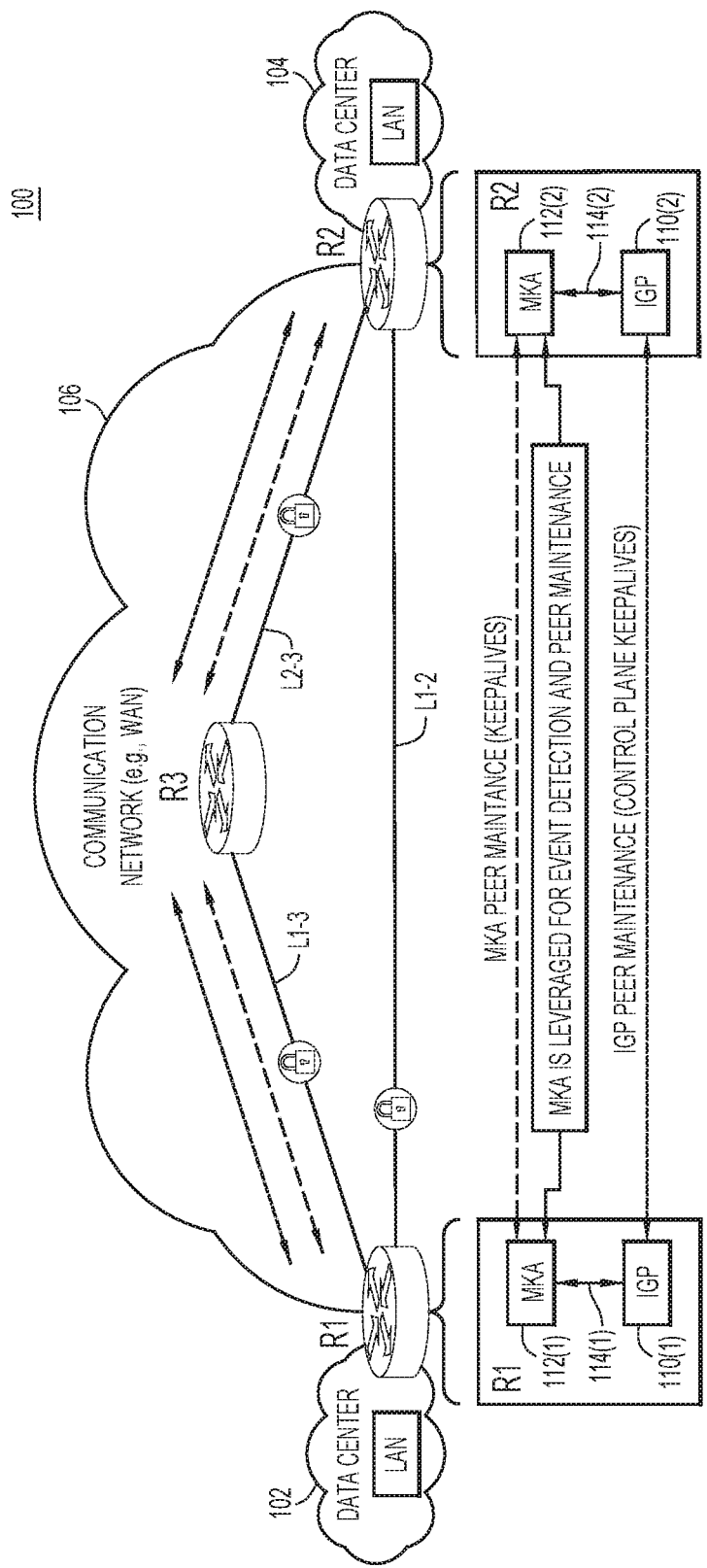
FIG. 1 is a block diagram of a network environment in which embodiments directed to triggering fast routing protocol convergence on security protected links may be implemented, according to an example embodiment.

Referring first to FIG. 1, there is shown a high-level block diagram of an example network environment 100 in which embodiments directed to triggering fast routing protocol convergence on security protected links may be implemented. Network environment 100 includes a first data center 102 including one or more local area networks (LANs), a second data center 104 including one or more LANs, and a communication network 106 connected to the data centers. In other example network environments, one or both of data centers 102, 104 may be replaced with one or more network devices, one or more endpoint devices (e.g., user devices), or a network of the network devices and/or endpoint devices. Communication network 106 may include one or more LANs and one or more wide area networks (WANs), such as the Internet. Data centers 102, 104 are shown by way of example, only. Data centers 102, 104 communicate with network 106 through network devices R1, R2, respectively. For example, network devices R1, R2 include gateway routers that provide to the LANs of data centers 102, 104, respectively, access to network 106. Typically, network 106 includes many network devices, such as routers and switches, only one of which is shown at R3 for purposes of simplicity, that perform routing of network traffic, e.g., data packets, across the network.

Routers R1-R3 forward or route network traffic (referred to more simply as "traffic") traversing the routers from a source of the traffic to a destination of the traffic. In support of this, each router Ri hosts a routing process that, when executed, implements a routing protocol 110(i) to determine network paths along which the traffic is to be routed. Using routing protocol 110(i), each router Ri maintains routing tables that contain routing information indicating one or more next hops of the network path. Routing protocol 110(i) also specifies types of routing information, and mechanisms for sharing the routing information among the routers to keep the routing tables fresh. Non-limiting examples of routing protocols that may be implemented in routers R1-R3 include the Interior Gateway Protocol (IGP) and the Exterior Gateway Protocol (EGP) (IGP/EGP). Examples of the IGP include (OSPF), Routing Information Protocol (RIP), Intermediate System to Intermediate System (IS-IS), and Enhanced Interior Gateway Routing Protocol (EIGRP). Embodiments presented herein implement IGP as the routing protocol, by way of example only. Other embodiments may implement alternative routing protocols or implement IGP in combination with one or more other routing protocols. In the ensuing description, the process that implements IGP and IGP are both referred to as "IGP."

Also, routers R1-R3 security protect the traffic forwarded by the routers. The security protection may take the form of encryption and/or authentication of the traffic. In support of this, each router Ri hosts a process that, when executed, implements a security protocol 112(i) by which the routers establish security sessions with each other over security protected links, and exchange security protected traffic with each other over the security protected links. Non-limiting examples of security protocols that may be implemented in routers R1-R3 include media access control (MAC) security (MACsec) (e.g. WAN MACsec), Internet Protocol (IP) security (IPsec), Transport Layer Security (TLS), and so on. MACsec includes a control plane protocol, referred to as the MACsec key agreement (MKA) protocol, to establish secure sessions and manage the secure sessions. Similarly, IPsec uses the Internet Key Exchange (IKE) to establish and manage secure sessions, and TLS/Datagram TLS (DTLS) use a heartbeat extension to manage secure sessions. Embodiments presented herein implement the security protocol as MACsec with MKA, by way of example only. Other embodiments may user alternative security protocols. In the ensuing description, the process that implements the MKA protocol and the MKA protocol are both referred to more simply as "MKA."

As shown in FIG. 1, routers R1, R2, and R3, have established secure sessions with one another using MKA, and forward security protected traffic to one another using routing information acquired through IGP. More specifically, routers R1, R2 and routers R1, R3 have established first and second secure sessions with each other over links L1-2 and L1-3, respectively. As a result, routers R1 and R2 exchange MACsec protected traffic with each other over link L1-2, and routers R1 and R3 exchange MACsec protected traffic with each other over link L1-3. Similarly, using the MKA protocol, routers R2 and R3 have established a third secure session with each other over a link L2-3, and exchange MACsec protected traffic with each over that link. Each pair of routers engaged in a secure session share a unique MACsec/MKA security associations (SA) relative to other pairs of routers engaged in other secure sessions. The pair of routers that share an MKA SA are referred to as MKA peers (more generally referred to as "security peers"). In many instances, the MKA peers engaged in a secure session may be remote from each other, i.e., the MKA peers may be non-directly connected MKA peers. In the case of WAN MACsec, for this example, the secure session spans a directly connected Ethernet link (or an emulated Ethernet transport service). To establish each SA, MKA initially acquires, and provides to the MKA peers for the SA, synchronized keying material with which the MKA peers encrypt and decrypt traffic exchanged between the MKA peers.

As part of maintaining each secure session/secure link L1-2, L1-3, and L2-3, MKA performs MKA peer maintenance for the secure session/secure link. Under MKA peer maintenance, MKA peers send to each other regular, periodic MKA keep alive messages over the secure link connecting the MKA peers. In one example, a packet body of each MKA keep alive message may include an Extensible Authentication Protocol (EAP)-over-LAN (EAPOL) Protocol Data Unit (PDU), referred to as a MACsec Key Agreement PDU (MKPDU). The regular, periodic MKA keep alive messages occur approximately every 2 seconds, for example, in which case each MKA peer sends a new MKA keep alive message to the other MKA peer approximately every 2 seconds. In FIG. 1, exchanges of MKA keep alive messages ("keepalives") are shown in dashed line. The MKA keep alive messages represent a "liveliness heartbeat" for the secure session/secure link that ensures both ends of the secure session are "alive." A consistent presence of the MKA keep alive messages indicates and maintains a valid, healthy secure session. On the other hand, an absence of the MKA keep alive messages indicates an MKA peer failure, also referred to more generally as a "security failure," and thus either a compromised secure session or disconnection of the link being secured. The absence of the MKA keep alive messages may result from a failure of the secure link, e.g., a physical link failure, and/or a failure of one of the MKA peers. Consequently, MKA peers monitor the MKA keep alive messages to detect an MKA peer failure. An MKA peer may declare an MKA peer failure when the MKA peer but does not receive from the other MKA peer, i.e., misses, a predetermined number of consecutive MKA keep alive messages, such as 3 MKA keep alive messages.

Whereas MKA discovers MKA peers in a secure session, IGP discovers IGP routing peers or neighbors (i.e., routers that are considered neighbors) for purposes of distributing routing information to IGP routing peers. Also, a control plane of IGP performs IGP peer maintenance. Using IGP peer maintenance, IGP neighbors exchange IGP keep alive messages with each other. In FIG. 1, exchanges of IGP keep alive messages ("keepalives") are shown in dashed line. A presence of the IGP keep alive messages indicates a healthy routing control plane for forwarding traffic. On the other hand, an absence of the IGP keep alive messages indicates a failure in the routing data plane. The absence of the IGP keep alive is typically detected when an IGP timer expires, referred to as an IGP timeout. An IGP timeout triggers an IGP convergence process that clears failed routes from routing tables and determines new routes/network paths that may be used to avoid the failure that caused the IGP timeout.

Conventionally, the respective failure mechanisms employed by MKA and IGP operate in parallel, but independently, i.e., without interacting with each other. Thus, in the case when MKA detects a security failure of a secure session, MKA does not notify IGP of the security failure. To make matters worse, IGP may not detect the security failure, and thus maintains in routing tables routes to a failed MKA peer. After a time delay, IGP may eventually detect the security failure (or an underlying cause of the security failure) based on an IGP timeout, and at that time remove the failed routes; but, the time delay may be on the order of tens of seconds, e.g., up to 40 seconds in the case of OSPF. The continued routing of traffic along the compromised route(s) during the time delay is undesirable.

More specifically, in the event of a physical link failure, referred to as a "direct failure," carrier detection of the link (e.g. loss of signal detection) triggers the routing process to converge to a new route. The time delay between the direct failure and the trigger may be less than a second. On the other hand, in the event of an indirect failure, the time delay between the indirect failure detection and the trigger may be much greater than a second. An example of an indirect failure is one in which there is no loss of signal, but a network path in an Ethernet line service has a failure that is not detected on router interfaces servicing the network path. Thus, the MKA keep alive is relied on to detect the in-direct failure, which introduces a minimum time delay of 6 second between when the indirect failure occurs and when the indirect failure is detected. An implementation that uses IGP/OSPF as the routing protocol may take up to 46 seconds (i.e., 6 seconds for MKA to detect the failure, and an additional 40 seconds for OSPF timeout) to remove from a routing table a failed route for a directly connected MACsec/MKA peer that was established over a MACsec encrypted link. In the case of an indirect WAN MACsec/MKA peer, the route may never be removed by the IGP upon MACsec failure, causing traffic to be "black-holed."

Other fail events that may cause sub-optimal upper layer IGP convergence include MKA misconfigurations or event such as:

a. A pre-shared key mismatch during a key rollover.

b. When using an EAP method, an access-reject message from a Remote Authentication Dial-In User Service (RADIUS) server (in the case of a certificate that has expired) or a lack of response from the RADIUS server.

To overcome the above-mentioned problems, and substantially reduce or eliminate the above-mentioned time delay, embodiments presented herein introduce a new signaling channel between MKA and IGP over which MKA signals security failures detected by MKA to the IGP. The signaling channel is indicated at 114(i) in FIG. 1. According to the embodiments, when MKA detects a security failure during a secure session, MKA immediately notifies the IGP of the security failure over signaling channel 114(i). Upon being notified of the security failure, the IGP instantly declares the remote peer "down" and removes routes to the relevant failed MKA/IGP peers, which prevents forwarding of traffic between the failed MKA peers, and the IGP determines new routes (i.e., performs IGP convergence). The embodiments (i) establish MKA as a security detection mechanism, and (ii) prioritize security failures detected by MKA above/over IGP keepalives. Thus, the embodiments tightly link MKA to IGP with respect to link/security failures.

Figure 2:
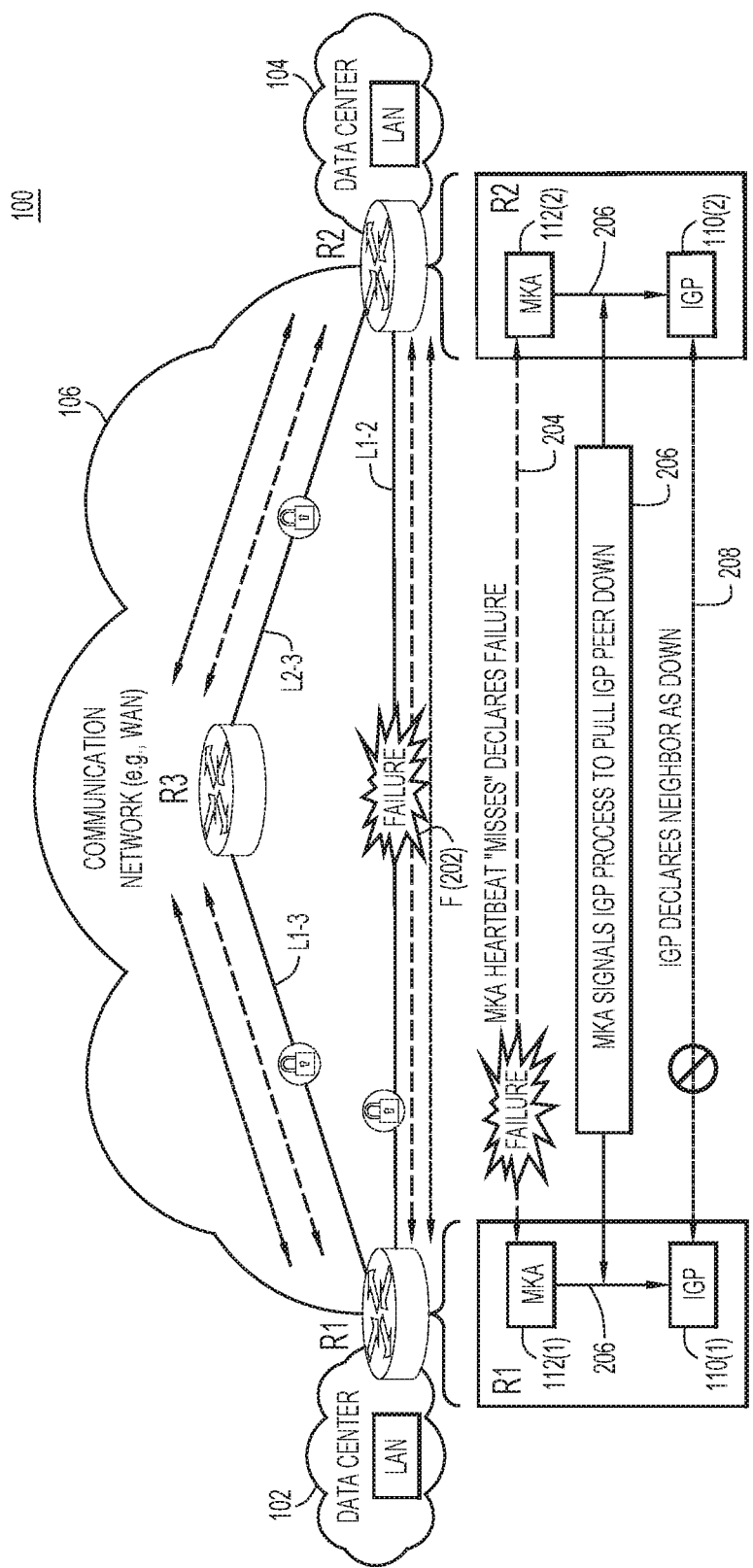
FIG. 2 is an illustration of a method of triggering fast routing protocol convergence responsive to a security failure on a link between routers in the network environment, according to an example embodiment.

With reference to FIG. 2, there is an illustration of an example method of responding to a security failure detected on one of the links of FIG. 1.

Initially, routers R1-R3 operate in a steady state as described above in connection with FIG. 1, without any security failures. Under the steady state, routers R1-R3 use various mechanism to detect link failures. The various mechanisms include Ethernet link carrier detect, IGP timeouts, and MKA keep alive heartbeats. As alluded to above, the embodiments presented herein target a security state of each link, using MKA as a master termination control. MKA "tracks" the security status of each link (and its MKA peer) and uses the status as a fail event detection indicator for the link, i.e., whether security on the link is valid. The status of the link as determined by MKA overrides IGP. That is, in the event MKA detects that the security of the link is compromised (as described below), the MKA protocol overrides the IGP timers to bring down the link, whether IGP indicates the link is healthy or IGP indicates the link is not healthy.

At 202, during the secure session between MKA peer routers R1 and R2 (more generally, "security peer routers R1 and R2"), a failure F occurs on link L1-2.

At 204, as a result of failure F, the local instance of MKA implemented in each of routers R1 and R2 misses the predetermined number of MKA heartbeat messages (e.g., misses 3 MKA heartbeat messages) indicative of a security failure on link L1-2, and declares a security failure. That is, each instance of the MKA protocol detects the security failure. In the example of FIG. 2, the security failure includes a secure link failure that interrupts MKA peer maintenance peer keepalives. In addition to a failure of the secure link, The MKA protocol may detect (and signal, as described below) as security failures many other security-related events that adversely affect or compromise the secure session, such as an MKA key misconfigurations, a corrupted SA, a pre-shared key mismatch during key rollover, and so on. MKA may detect as a security failure any one of the aforementioned events.

At 206, in response to detecting the security failure, the local instance of MKA immediately signals the security failure to the local instance of IGP via the local signaling channel. That is, the local instance of MKA immediately notifies the local instance of IGP of the security failure. MKA signals the security failure to IGP independent of whether the physical link and IGP peer are operating normally and available (i.e., both "Up") or not operating normally/not available (i.e., one or more of the physical link and an IGP peer are "Down"). IGP may eventually detect a corresponding failure, e.g., an IGP peer between R1 and R2 is "Down," but not until IGP timeout. In that situation, the signaling of the security failure by MKA occurs before the IGP timeout, which means that MKA is the master indicator that the link is valid/invalid.

At 208, upon being notified of the security failure, the local instance of IGP immediately removes from the local routing table the route (e.g., the neighboring IGP peer) directed to the failed MKA peer. This triggers a reroute of traffic, e.g., a reroute from R2-to-R1 direct over to R2-to-R3-to-R1 indirect. Also, the local instance of IGP exchanges routing information with neighbors declaring the IGP neighbor is "Down."

The above-described method advantageously allows MACsec peer validity to control the link(or route) "Up"/"Down" state, verses merely the link state (i.e., link Up, IGP Peer Up), and synchronizes MKA with IGP.

Figure 3:
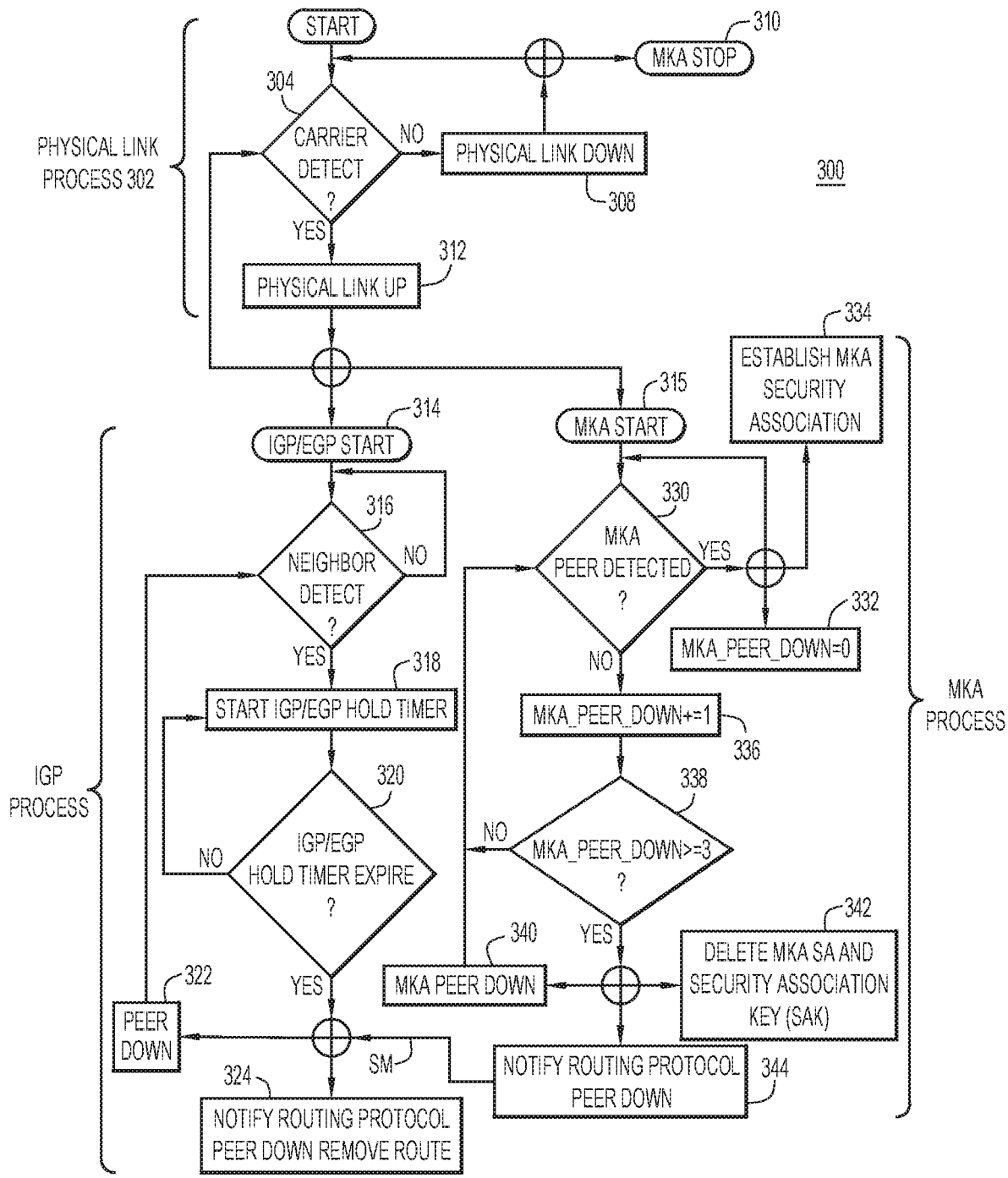
FIG. 3 is a flowchart of a detailed method of triggering fast Interior Gateway Protocol (IGP) convergence on media access control (MAC) security (MACsec) encrypted links using the MACsec key agreement (MKA) protocol, as performed in one of the routers, according to an example embodiment.

With reference to FIG. 3, there is a flowchart of an example method 300 of triggering fast IGP convergence on MACsec encrypted links using MKA, as performed in any of routers R1-R3. Method 300 includes operations to monitor various link states performed in part by IGP and MKA executing in a router.

At 302, a physical link state is monitored. This includes operations 304-312.

At 304, it is determined whether a carrier signal is detected on a physical link. If a carrier signal is not detected, flow proceeds to 308, where the physical link is declared "Down." From 308, flow proceeds in parallel back to 304 and to 310, where any existing MKA process is terminated. On the other hand, if the carrier signal is detected, flow proceeds from 304 to 312, where the physical link is declared "Up," i.e., operational. From 312, flow proceeds in parallel to 314 and 315.

At 314, an IGP process (i.e., IGP) is started. At 315 an MKA process (i.e., MKA) is started. IGP and MKA execute in parallel, i.e., concurrently. IGP includes the following operations.

At 316, it is determined whether an IGP neighbor is detected. If an IGP neighbor is not detected, flow returns to 316.

If an IGP neighbor is detected, flow proceeds to 318, where an IGP/EGP hold timer is started, and flow then proceeds to 320. At 320, it is determined whether the IGP/EGP hold timer has expired (referred to above as "IGP timeout"). If the IGP/EGP hold timer has not expired, flow returns to 320. If the IGP/EGP hold timer has expired, flow proceeds from 320 to 322 and 324 in parallel. At 322, IGP "Peer Down" is declared, and flow proceeds back to 316.

At 324, IGP "Peer Down" is declared and IGP immediately executes an IGP neighbor termination process to remove from routing tables any routes directed to a failed MKA peer. Another mechanism by which flow is vectored, or forced, to 324 is receipt by IGP of a signaling message (SM) from MKA (which was initiated at 315) that indicates a security failure has occurred. Receipt of the signaling message immediately vectors the flow of IGP (wherever the IGP process may be) to 324, and thus overrides waiting for the IGP/EGP timer to expire (i.e., overrides waiting for the IGP timeout). Essentially, the signaling message overrides the IGP timer for a given route, wherever it may be in its flow, to trigger IGP convergence as soon as the signal message is received.

More specifically, at 324, the IGP neighbor termination process:

a. Terminates the IGP neighbor session.
b. Declares the IGP session as "Dead."
c. The Dead IGP session rapidly removes the IGP peer from any usability (i.e., the IGP peer is removed from routing tables including the Routing Information Base (RIB)/Forwarding Information Base (FIB)). This, prevents "black holing" of traffic.
d. Triggers an IGP rerouting process (performs flood, Topology Independent (TI)-Loop Free Alternate (LFA) process, and so on) based on new routes available.

MKA includes the following operations.

At 330, it is determined whether an MKA peer is detected. If an MKA peer is detected, flow proceeds in parallel to 332, to 334, and back to 330. At 332, a consecutively missed MKA message counter "MKA_Peer_Down" is set to 0, indicating that no consecutive MKA keep alive messages have been missed. At 334, an MKA SA is established for a security session with the detected MKA peer.

If an MKA peer is not detected, flow proceeds to 336, where the MKA message counter is incremented, indicating one more consecutive MKA keep alive message have been missed, and flow then proceeds to 338.

At 338, it is determined whether the MKA message counter=3, indicating that 3 consecutive MKA keep alive messages have been missed. If no, flow returns to 330. If yes, flow proceeds in parallel to 340, 342, and 344. At 340, "MKA Peer Down" is declared, and flow then returns to 330. At 342, the MKA SA is deleted and an associated SA key is deleted (i.e. the secure session established at 334 is completely torn-down). At 344, the signaling message is generated and sent to IGP, as indicated above in connection with 324.

Figure 4:
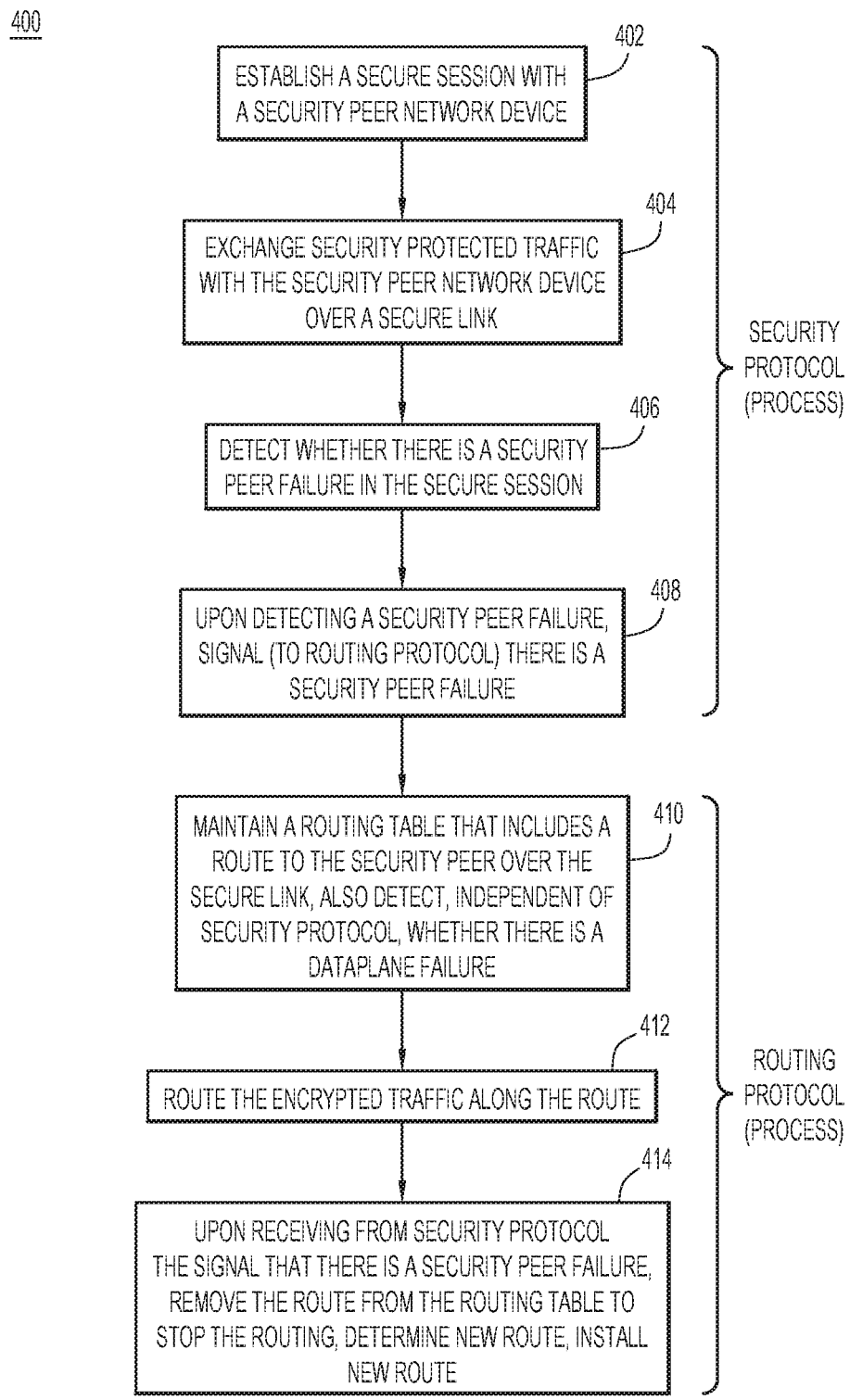
FIG. 4 is a flowchart of a high-level method of triggering fast routing protocol convergence on security protected links using the state of a security protocol, according to an example embodiment.

With reference to FIG. 4, there is a flowchart of an example high-level method 400 of triggering fast routing protocol convergence on security protected links using a security protocol, according to an example embodiment. Method 400 may be performed by a network device, e.g., any of routers R1-R3, in network environment 100. The security protocol may include MACsec/MKA. The routing protocol may include IGP or EGP.

The network device executes a security process that implements the security protocol. The network device also executes a routing process that implements the routing protocol. The security protocol and the routing protocol operate concurrently, i.e., the processes implementing the two protocols are executed concurrently. The security protocol and the routing protocol execute as substantially separate and independent processes, except for sharing of, and reaction to, signaling information, as described herein. In an example, the security protocol may operate at a layer-2 (L2) level, while the routing protocol may operate at a layer-3 (L3) level.

The security protocol performs the following operations.

At 402, the security protocol establishes a secure session with a security peer network device (e.g., an MKA peer) over a secure link.

At 404, the security protocol exchanges security protected traffic with the security peer network device over the secure link.

At 406, the security protocol detects whether there is a security failure in the secure session. The security failure may be any failure detected by the security protocol and that compromises the secure session. This may be a failure of the secure link itself or a failure of the security peer network device, e.g., a key or other security related misconfiguration. In an example, the security protocol detects a security failure based on an absence of regular, periodic security protocol heartbeat messages.

At 408, upon detecting a security failure, the security protocol immediately signals (to the routing protocol) that there is a security failure. For example, the security protocol sends to the routing protocol a message indicating the security failure. The message may indicate a route that has failed.

The routing protocol performs the following operations.

At 410, the routing protocol maintains a routing table (e.g., RIB/FIB) that includes a route to the security peer network device over the secure link. The routing table includes entries that indicate a next hop (i.e., routing peer or routing neighbor). The secure link comprises multiple such next hops. The routing protocol also maintains a routing peer maintenance session during which the routing protocol detects, independent of the security protocol, whether there is a dataplane failure along the route, i.e., whether the route is a failed route. For example, the routing protocol monitors a routing protocol timer for a timeout indicative of a failed route.

At 412, the routing protocol routes the encrypted traffic along the route based on the routing table.

At 414, upon receiving from the security protocol the signal that there is a security failure, the routing protocol immediately declares that the associated route is down, and removes the route (i.e., the entries that indicate the route) from the routing table to stop any further routing along that route. Then, the routing protocol determines a new route to the security peer network device, and installs the new route into the routing table. In response to the signal, the routing protocol removes the route and determines the new route whether the routing protocol has or has not detected a dataplane failure along the route. Thus, the signal overrides the failure detect of the routing protocol.

Figure 5:
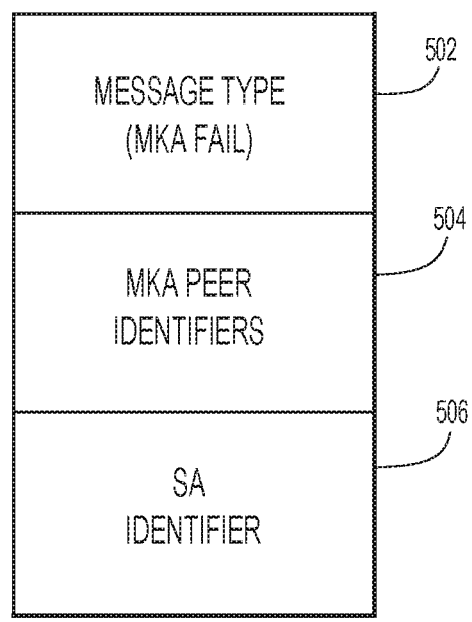
FIG. 5 is an illustration of a signaling message sent from the MKA protocol to IGP indicating a security failure in a secure session, according to an example embodiment.

With reference to FIG. 5, there is an illustration of a format of an example signaling message 500 sent from the MKA protocol to IGP when the MKA protocol detects a security failure during a secure session established between MKA peers. Signaling message 500 may include: a message type indicator 502 that indicates an MKA security failure, and a type of failure (e.g., link failure, MKA peer failure); identifiers 504 for MKA peers, which may include information such as IP addresses of the MKA peers; and an identifier 506 of a security association for the failed secure session.

Figure 6:
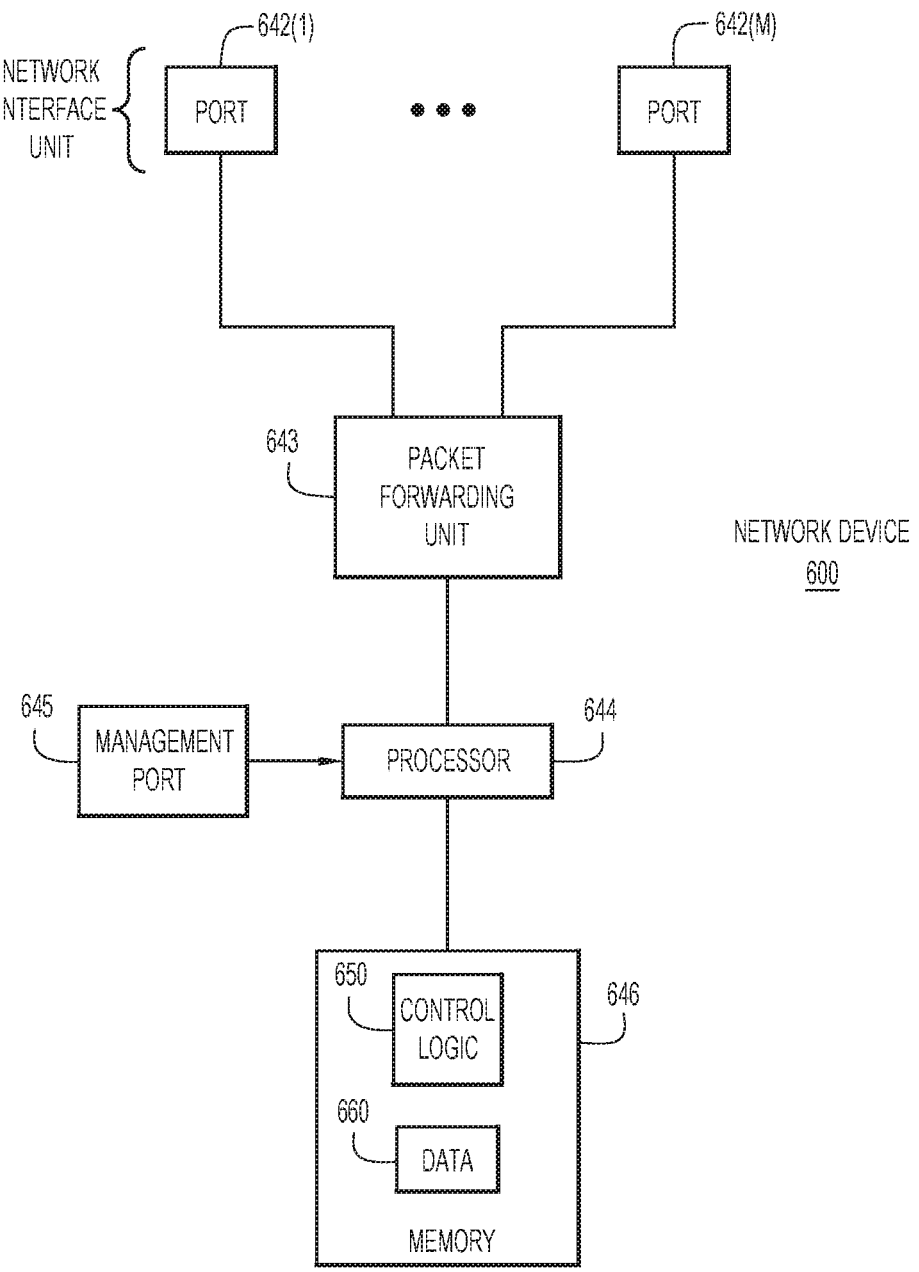
FIG. 6 is a block diagram of a network device, representative of the routers, according to an example embodiment.

With reference to FIG. 6, there is a block diagram of an example network device 600, representative of each of routers R1-R3 depicted in FIG. 1. Network device 600 may include a network router or a switch, for example. Network device 600 comprises a network interface unit having a plurality of network input/output (I/O) ports 642(1)-642(M) to send traffic (e.g., data packets, whether in security protected form or unprotected form) to a network (e.g., network 106 and LANs) and receive traffic (e.g., data packets) from the networks, a packet forwarding/processing unit 643, a network processor 644 (also referred to simply as "processor"), a management port 645 to exchange control messages with other network devices and an administration function, and a memory 646. The packet forwarding/processing unit 643 is, for example, one or more application specific integrated circuits (ASICs) that include packet buffers, packet queues, and other control logic for performing packet forwarding operations, such as an RIB/FIB. The processor 644 may include multiple processors, which may be implemented as software or hardware processors. For example, processor 644 may include a microcontroller or microprocessor that is configured to perform higher level controls of network device 600. To this end, the memory 646 stores software instructions that, when executed by the processor 644, cause the processor 644 to perform a variety of operations including operations described herein, such as to execute processes to implement IGP 110(*i*) and MKA 112(*i*) as described herein. For example, the memory 646 stores instructions for control logic 650 to perform operations described herein in connection with FIGS. 2-4. Control logic 650 may also include logic components in packet forwarding unit 643. Memory 646 also stores data 660 used and generated by logic 650.

In summary, embodiments presented herein leverage the session liveliness mechanism of MKA in networks running MACsec encryption to influence upper layer routing protocols, such as IGP, i.e., to trigger faster routing convergence. The MKA state notifies IGP of the security state of the link supporting a secure session between MKA peers and whether routes to networks that should be secured should still be instantiated in the routing tables. That is, the embodiments leverage MKA peer liveliness to notify the routing process of a failed link. In the embodiments, routing protocol convergence times are not dependent upon IGP keepalives (i.e., IGP timeouts), since MKA keepalives trigger IGP/EGP convergence. The embodiments close a gap when leveraging high-speed MACsec encryption where traffic can otherwise be black-holed when an MKA peer session is torn down (e.g., due to an invalid key, revocation of EAP credentials, a network issue between remote MKA peers, and the like).

In further summary, as mentioned above, MKA peer liveliness notifies the routing protocol process (e.g., OSPF, IS-IS, EIGRP, or BGP) of a failure of the MACsec enabled link (the link is "Down") to trigger a convergence (normal routing protocol behaviors as described for the particular routing protocol) away from the route that no longer is encrypted. Another advantage of the embodiments is removal of routes even when the link and IGP are functioning properly, but the MKA system is not (this allows removal of routes due to MACsec level event detection in the event of invalid key failures, human error, key misconfigurations, and so on, resulting from, for example using pre-shared key mechanisms). The embodiments target ultra-secure environments and customers where the security of the link is the highest priority, such that no traffic is allowed to traverse the link without encryption; this is enforced by using the validity of that secure session (e.g., using MKA) as the event trigger to cause the routing protocol route to be marked as "Up" or "Down." In the embodiments: MKA serves as the "secure event detection" mechanism for security of a link running MACsec; and, traffic is moved off of the failed link, based on MKA attributes, thus eliminating the need for another control plane protocol, such as Bidirectional Forwarding Detection (BFD).

In one form, a method is provided comprising: at a network device configured to communicate with a network, executing a security protocol and executing a routing protocol, wherein executing the security protocol includes: establishing a secure session with a security peer network device; exchanging security protected traffic with the security peer network device over a secure link; detecting whether there is a security failure in the secure session; and upon detecting a security failure, signaling to the routing protocol that there is a security failure; and the executing the routing protocol includes: maintaining a routing table that indicates a route to the security peer network device over the secure link; routing the security protected traffic along the route; and upon receiving from the security protocol the signaling that there is a security failure, removing the route from the routing table to stop the routing.

In another form, an apparatus is provided comprising: a network interface unit configured to communicate with a network; and a processor coupled to the network interface unit and configured to perform: executing a security protocol to: establish a secure session with a security peer network device; exchange security protected traffic with the security peer network device over a secure link; detect whether there is a security failure in the secure session; and upon detecting a security failure, signal to a routing protocol that there is a security failure; and executing a routing protocol to: maintain a routing table that indicates a route to the security peer network device over the secure link; route the security protected traffic along the route; and upon receiving from the security protocol the signal that there is a security failure, remove the route from the routing table to stop the routing.

In yet another form, a non-transitory computer readable medium is provided. The computer readable medium stores instructions that, when executed by a processor, cause the processor to: execute a security protocol and a routing protocol, wherein: executing the security protocol includes: establishing a secure session with a security peer network device, and exchanging security protected traffic with the security peer network device over a secure link; detecting whether there is a security failure in the secure session; and upon detecting a security failure, signaling to the routing protocol that there is a security failure; and executing the routing protocol, includes: maintaining a routing table that indicates a route to the security peer over the secure link, and routing the security protected traffic along the route; and upon receiving from the security protocol the signaling that there is a security failure, removing the route from the routing table to stop the routing.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network device configured to communicate with a network, executing a security protocol and executing a routing protocol, wherein:
   executing the security protocol includes:
   establishing a secure session with a security peer network device, and exchanging security protected traffic with the security peer network device over a secure link;
   detecting whether there is a security failure in the secure session; and
   upon detecting the security failure, signaling to the routing protocol that there is the security failure by sending, to the routing protocol, a message having a message type to indicate the security failure, a failure type, and identifiers of security peers; and
   executing the routing protocol includes:
   maintaining a routing table that indicates a route to the security peer network device over the secure link, and routing the security protected traffic along the route; and upon receiving from the security protocol signaling that there is the security failure, immediately executing a neighbor termination process and removing the route from the routing table to stop routing.

2. The method of claim 1, wherein:
executing the security protocol includes executing a media access control (MAC) security (MACsec) Key Agreement (MKA) protocol; and
exchanging the security protected traffic includes exchanging MACsec protected traffic.

3. The method of claim 2, wherein executing the routing protocol includes executing an Interior Gateway Protocol (IGP) or an Exterior Gateway Protocol (EGP).

4. The method of claim 1, wherein:
detecting whether there is the security failure in the secure session includes detecting, independent of the routing protocol, an absence of regular, periodic heartbeat messages from the security peer network device.

5. The method of claim 4, wherein:
executing the routing protocol further includes monitoring, independent of the security protocol, a routing protocol timer for a timeout indicative of a route failure; and
executing the security protocol further includes, prior to when routing protocol monitoring detects the timeout of the routing protocol timer:
detecting the absence of the regular, periodic heartbeat messages; and
upon detecting the absence of the regular, periodic heartbeat messages, performing the signaling to the routing protocol.

6. The method of claim 1, wherein executing the routing protocol further includes:
detecting, independent of the security protocol, whether there is a routing peer failure for purposes of routing; and
upon receiving from the security protocol signaling that there is the security failure, removing the route includes removing the route to stop the routing whether the routing peer failure is detected or is not detected, such that signaling and removing the route override detecting whether there is the routing peer failure.

7. The method of claim 6, wherein executing the routing protocol further includes:
upon receiving signaling that there is the security failure, and after removing the route, determining a new route to the security peer network device; and
upon determining the new route, installing the new route in the routing table, and routing the security protected traffic to the security peer network device over the new route.

8. The method of claim 1, wherein executing the security protocol and executing the routing protocol are performed concurrently.

9. An apparatus comprising:
a network interface unit configured to communicate with a network; and
a processor coupled to the network interface unit and configured to:
execute a security protocol to:
establish a secure session with a security peer network device, and exchange security protected traffic with the security peer network device over a secure link;
detect whether there is a security failure in the secure session; and
upon detecting the security failure, signal to a routing protocol that there is the security failure by sending, to the routing protocol, a message having a message type to indicate the security failure, a failure type, and identifiers of security peers; and
execute the routing protocol to:
maintain a routing table that indicates a route to the security peer network device over the secure link, and route the security protected traffic along the route; and
upon receiving from the security protocol the signal that there is the security failure, immediately execute a neighbor termination process and remove the route from the routing table to stop routing.

10. The apparatus of claim 9, wherein:
the security protocol includes a media access control (MAC) security (MACsec) Key Agreement (MKA) protocol; and
the security protected traffic includes MACsec protected traffic.

11. The apparatus of claim 10, wherein the routing protocol includes a Interior Gateway Protocol (IGP) or a Exterior Gateway Protocol (EGP).

12. The apparatus of claim 9, wherein:
the security protocol is configured to detect whether there is the security failure in the secure session by detecting, independent of the routing protocol, an absence of regular, periodic heartbeat messages from the security peer network device.

13. The apparatus of claim 12, wherein:
the routing protocol is further configured to monitor, independent of the security protocol, a routing protocol timer for a timeout indicative of a route failure; and
the security protocol is further configured to, prior to when the timeout of the routing protocol timer is detected by the routing protocol:
detect the absence of the regular, periodic heartbeat messages; and
upon detecting the absence of the regular, periodic heartbeat messages, send the signal to the routing protocol.

14. The apparatus of claim 9, wherein the routing protocol is further configured to:
detect, independent of the security protocol, whether there is a routing peer failure for purposes of routing; and
upon receiving from the security protocol the signal that there is the security failure, remove the route whether the routing peer failure is detected or is not detected.

15. The apparatus of claim 14, wherein the routing protocol is further configured to:
upon receiving the signal that there is the security failure, and after the route is removed, determine a new route to the security peer network device; and
upon determining the new route, install the new route in the routing table, and route the security protected traffic to the security peer network device over the new route.

16. A non-transitory computer readable storage media encoded with instructions that, when executed by a processor of a network device configured to communicate with a network, cause the processor to perform:
executing a security protocol and executing a routing protocol, wherein:
executing the security protocol includes:
establishing a secure session with a security peer network device, and exchanging security protected traffic with the security peer network device over a secure link;
detecting whether there is a security failure in the secure session; and upon detecting the security failure, signaling to the routing protocol that there is the security failure by sending, to the routing protocol, a message having a message type to indicate the security failure, a failure type, and identifiers of security peers; and executing the routing protocol includes:

maintaining a routing table that indicates a route to the security peer network device over the secure link, and routing the security protected traffic along the route; and upon receiving from the security protocol signaling that there is the security failure, immediately executing a neighbor termination process and removing the route from the routing table to stop routing.

17. The non-transitory computer readable storage media of claim 16, wherein:

the instructions to cause the processor to perform executing the security protocol include instructions to cause the processor to perform executing a media access control (MAC) security (MACsec) Key Agreement (MKA) protocol; and the instructions to cause the processor to perform exchanging the security protected traffic include instructions to cause the processor to perform exchanging MACsec protected traffic.

18. The non-transitory computer readable storage media of claim 16, wherein:

the instructions to cause the processor to perform detecting whether there is the security failure in the secure session include instructions to cause the processor to perform detecting, independent of the routing protocol, an absence of regular, periodic heartbeat messages from the security peer network device.

19. The non-transitory computer readable storage media of claim 18, wherein:

the instructions to cause the processor to perform executing the routing protocol include instructions to cause the processor to perform monitoring, independent of the security protocol, a routing protocol timer for a timeout indicative of a route failure; and the instructions to cause the processor to perform executing the security protocol include instructions to cause the processor to perform, prior to when the monitoring detects the timeout of the routing protocol timer:

detecting the absence of the regular, periodic heartbeat messages; and upon detecting the absence of the regular, periodic heartbeat messages, performing the signaling to the routing protocol.

20. The non-transitory computer readable storage media of claim 16, wherein the instructions to cause the processor to perform executing the routing protocol further include instructions to cause the processor to perform:

detecting, independent of the security protocol, whether there is a routing peer failure for purposes of routing; and upon receiving from the security protocol signaling that there is the security failure, removing the route to stop the routing whether the routing peer failure is detected or is not detected, such that signaling and removing the route override detecting whether there is the routing peer failure.

* * * * *